United States Patent [19]

Harada

[11] Patent Number: 4,747,547

[45] Date of Patent: May 31, 1988

[54] PROCESS FOR THE TREATMENT OF SLAG GENERATED IN AN IRONWORKS

[75] Inventor: Akihisa Harada, Kitakyushu, Japan

[73] Assignee: Nippon Jiryoku Senko Co., Ltd., Fukuoka, Japan

[21] Appl. No.: 929,454

[22] Filed: Nov. 12, 1986

[30] Foreign Application Priority Data

Jun. 11, 1986 [JP] Japan .................................. 61-136722

[51] Int. Cl.[4] ........................ B02C 19/12; B02C 23/20
[52] U.S. Cl. ........................................ 241/19; 241/24; 241/29
[58] Field of Search ............. 241/79.1, 24, 19, 152 A, 241/29, 75, 54

[56] References Cited

U.S. PATENT DOCUMENTS 4,662,570  5/1987  Heeren et al. ..................... 241/79.1

FOREIGN PATENT DOCUMENTS 135533  7/1985  Japan ..................................... 241/24

Primary Examiner—Mark Rosenbaum
Attorney, Agent, or Firm—Armstrong, Nikaido, Marmelstein & Kubovcik

[57] ABSTRACT

The present invention relates to a process for the treatment of a slag generated in an ironworks and comprises rough crushing a solidified slag generated in an ironworks with a crusher into a specified particle size, a step of further crushing for separation, and dividing the crushed slag by specific gravity separation with a dry vibrating air classifier and a step of magnetic separation into a metal component and a slag component. This process can be carried out even in a cold district where water freezes in winter.

1 Claim, 2 Drawing Sheets

PROCESS FOR THE TREATMENT OF SLAG GENERATED IN AN IRONWORKS

BACKGROUND OF THE INVENTION

1. Field of the Invention

The present invention relates to a process for the treatment of a slag generated in a blast furnace, converter or electric furnace of an ironworks. Particularly, it relates to a dry process for the treatment of a slag generated in an ironworks.

2. Description of the Prior Art

Up to this time, a slag generated in an ironworks has been used in reclamation after the selective recovery of a big ingot by hands or has been discarded as such. However, such a slag still contains metals as shown in Table 1, even after the above selective recovery. Therefore, the recovery of such remaining metals has been carried out.

In this specification, the term "metal" refers to one having a particle size of 0.5 mm or above contained in a slag.

TABLE 1

|  | (weight %) metal content rate |
| --- | --- |
| stainless steel slag | 1.5~2.5 |
| common steel slag | 2~3 |
| special steel slag | 0.5~1.5 |

For example, a slag generated in an ironworks, particularly, a stainless steel slag generated in a stainless steel-manufacturing step, has been treated by a process which comprises crushing a solidified slag into a proper particle size and passing the crushed slag through a gravity separater to thereby recover metals having high specific gravities.

The above process has been generally carried out by using a wet jig wherein the crushed stainless steel slag is thrown into flowing water to be divided into heavy metals and a light slag based on the difference in specific gravity. Therefore, the process has a disadvantage in that such a jig cannot be used in winter, because water freezes in that season.

Further, when a stainless steel slag is passed through a wet separator to thereby recover metals, the residual slag forms sludge and therefore must be suitably dried to be used as a resource such as filler material. That is to say, the process has another disadvantage in that the residual slag requires additional treatments.

On the other hand, although a process which comprises recovering metals from a crushed stainless steel slag having a proper particle size with a dry magnetic separator has been sometimes carried out, it has a disadvantage in that an austenitic stainless steel can not effectively be recovered from a slag containing it, because an austenitic stainless steel is not adherent to a magnet.

Although these disadvantages have been described with respect to a stainless steel slag, similar disadvantages occur when a common steel slag or a special steel slag is treated by a wet process.

SUMMARY OF THE INVENTION

The present invention has been made in view of the above circumstances. The first object of the present invention is to provide a process for the recovery of metals from a slag generated in an ironworks (for example, stainless steel slag or common steel slag) which can be carried out even in a cold district.

The second object of the present invention is to recover a residual slag remaining after the recovery of metals from a slag generated in an ironworks in a state of a dry power of granules and utilize it.

The process for the treatment of a slag generated in an ironworks according to the present invention having the above objects comprises the steps of rough crushing to crush the slag into pieces having a particle size of 50 mm or less by use of a dry-type crusher, further crushing for separation in a ventilated mill to classify said roughly crushed slag into a light slag dust and a residual heavy slag having a particle size of 20 mm or less, separation by specific gravity to extract metal components having a high specific gravity from said crushed and separated residual slag by use of a dry-type classifier, and magnetic separation to recover magnet-adherent metals from the remaining slag from which said metal components are extracted. The separation by specific gravity is performed with a dry vibrating air classifier of the upward-draft type which is provided with a vibrating screen sloped at an angle to the horizontal, which screen is vibrating at a frequency between 5 and 20 Hz while air is blown vertically upward from below the screen. In operation, the components of larger specific gravity are moved forward or upward on the screen, while the particles with a lower specific gravity are moved in the opposite direction as a result of being lifted by the air.

The term "a slag generated in an ironworks" involves stainless steel slags generated in the step of manufacturing stainless steel, common steel slags generated in the step of manufacturing common steel and special steel slags generated in the step of manufacturing special steel.

Further, a process is set forth wherein a jaw crusher and a circumferential discharge mill are used as a crusher and the solidified slag is primarily crushed with said jaw crusher and further crushed with said circumferential discharge mill into a particle size of 50 mm or below is preferred.

Furthermore, a process is set forth wherein a granular slag is recovered from a light slag dust separated with a gravity settling room which is a dust precollector of a bag filter or a dust collector such as a cyclone. Metals having high specific gravities are recovered from the granular slag with an air classifier and the remaining granular slag is subjected to magnetic separation to recover a magnet-adherent metal is also possible.

The slag dust remaining after the recovery of a granular slag with a dust precollector or the granular slag remaining after the recovery of a magnet-adherent metal by magnetic separation may be used as a filler material for use in, for example, civil engineering works.

As described above, according to the present invention, it is possible to treat a slag generated in an ironworks by a dry process using no water and the treatment can be smoothly carried out even in a cold district where water freezes in winter.

Further, the slag component of a dry state can be obtained from a slag generated in an ironworks, so that the slag component is easily handled and stocked and can be used as a filler for plastics or engineering works as such or after suitable pulverizing.

DETAILED DESCRIPTION OF PREFERRED EMBODIMENTS

Figure 1:
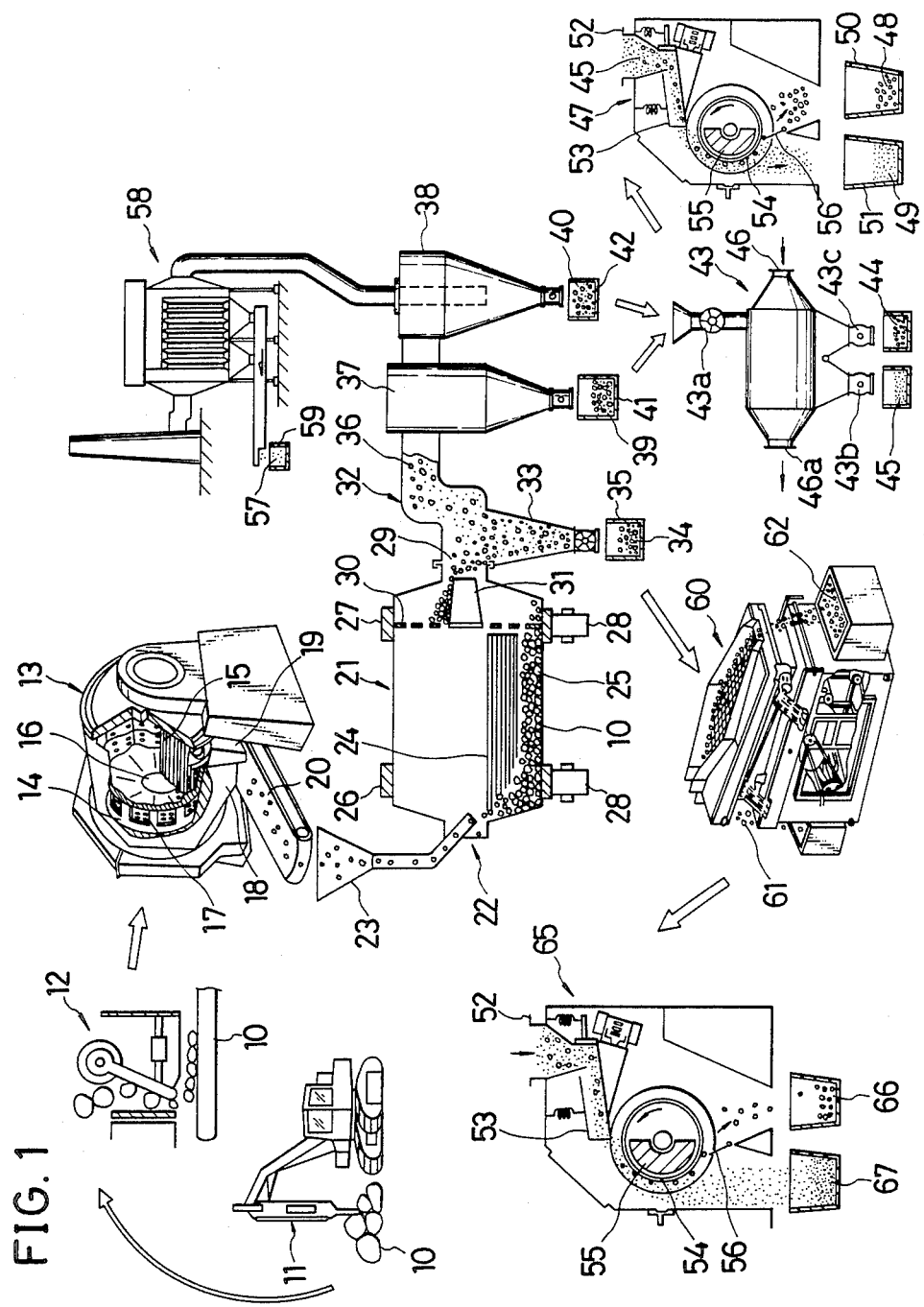
FIG. 1 is a flow chart showing an example of the process for the treatment of a slag generated in an ironworks according to the present invention.

As shown in FIG. 1, a stainless steel slag 10 which is an example of the slag generated in an ironworks (hereinafter "slag") is crushed into a suitable size with a breaker 11 fitted with a hydraulic unit and further crushed with a jaw crusher 12 into a size of about 100 to 150 mm.

The slag 10 crushed with the jaw crusher 12 is further crushed with a circumferential discharge mill 13 to a size of 50 mm or below. This circumferential discharge mill 13 comprises a rotary drum 14 and a rod 15 (crushing medium) provided therein as shown in the figure. The slag 10 is thrown into the drum 14 from a material inlet 16, crushed with the rods 15, discharged from a plurality of discharge orifices 17 formed on the circumference of the drum 14 and having a specified size to fall on a belt conveyor 20, which is an example of conveying means, through chutes 18 and 19.

The slag 10 fallen on the belt conveyor 20 is transferred by the belt conveyor 20 and discharged into a hopper 23 provided at material inlet 22 of a ventilated mill 21.

As shown in the figure, the ventilated mill 21 comprises a drum 25 fitted with a plurality of rods 24 (crushing medium) therein and four rollers 28 accepting rail rings 26 and 27 provided on the outer circumference of the drum 25. Further in the mill 21, an air current flows from the material inlet 22 to a material outlet 29 by the action of a suction fan, which is not shown in the figure, connected to the material outlet 29.

Further, the ventilated mill 21 is provided with a lattice screen 30 therein to discharge only a residual slag having a particle size of 20 mm or below downward (that is, in the direction of the material outlet 29). In the mill 21, uncrushed slag 10 having a size of more than 20 mm is impact-crushed with the rods 24 into a particle size of 20 mm or below.

A conical guide drum 31 is provided at the center of the screen 30. The slag 10 moves upward with the rotation of the drum 25 and falls to go toward the material outlet 29.

A transport pipe 32 is provided at the outlet 29 of the mill 21 in a state apart therefrom to transport the material discharged from the outlet 29. Further, a falling chute 33 is provided near the end of the pipe 32 to collect a residual coarse slag 34 and make it fall into a container 35.

On the other hand, a light slag dust 36 blown off in the transport pipe 32 by an air current having a velocity of 15 to 25 m/sec is transferred into a gravitational settling room 37 which is an example of the dust collector to be connected to the pipe 32 and a cyclone 38 which is an example of the dust collector to recover granular slags 39 and 40 from the dust 36, respectively.

The granular slags 39 and 40 are collected in containers 41 and 42, respectively, and divided by an air classifier 43 into metals 44 having high specific gravities and a light granular slag 45.

In this air classifier 43, an air current flows from an inlet 46 to an outlet 46a by the action of a fan which is not shown in the figure and divides the falling granular slags 39 and 40 based on the difference in settling velocity. The flow velocity of the air current is 5 to 10 m/sec which is lower than that of the air current flowing in the transport pipe 32, so that a metal 44 is effectively recovered. In the figure, numerals 43a, 43b and 43c are rotary valves.

Although a metal having a large particle size is recovered with the air classifier 43, a metal having a small particle size is still contained in the light granular slag 45. The slag 45 is divided into a magnet-adherent metal 48 and a tailing 49 with a magnetic separator 47 and placed in containers 50 and 51.

The above magnetic separator 47 has a well-known construction, that is, comprises a vibrating feeder 53 provided in the lower part of a chute 52 which is a material inlet, a rotary drum 54 provided in the lower part of the feeder 53, a magnet 55 provided in the rotary drum 54 and a separating plate 56 provided in the lower part of the drum 54. The slag 45 thrown from the top is divided into a metal 48 and a tailing 49 by magnetic force.

A powdery dust 57 which has not been collected with the cyclone 38 which is an example of the dust collectors is collected by a known bag filter 58 and placed in a container 59.

On the other hand, the residual slag 34 which has been discharged from the ventilated mill 21 and collected by the falling chute contains a metal having a relatively large particle size and a slag having a large particle size. The slag 34 is divided into a metal 61 and a slag 62 with a dry vibrating air classifier 60.

Figure 2:
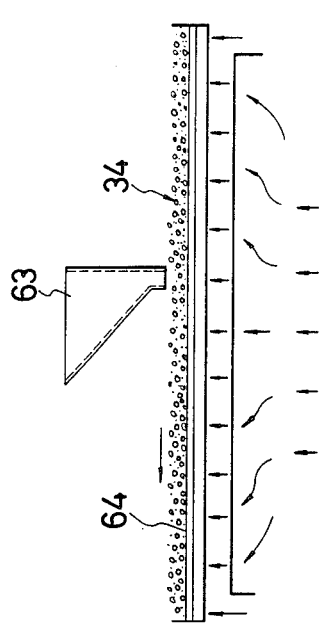
FIGS. 2 and 3 are partially cutaway side elevations illustrating the action of a dry vibrating air classifier used in the above example.

The fundamental principle of the above dry vibrating air classifier 60 will be described in more detail by referring to FIGS. 2 and 3. The residual slag 34 thrown from a hopper 63 falls on a screen 64. The screen 64 is vibrated in an ascending direction that is in the direction of A-B shown in FIG. 3 with a frequency of vibration of about 5 to 20 c/sec by a vibrating machine driven by a motor which is not shown in the figure. The screen 64 is tilted by about 1 to 2 degrees against the horizontal plane and a fan which is not shown in the figure is provided under the screen 64 to give an air current of a velocity of 1 to 5 m/sec blowing from under the screen 64 to over the screen 64. The aircurrent blows through the residual slag 34 on the screen 64 to float a slag 62 having a small specific gravity. The slag 62 floated by the air current is transferred downward because of the slope of the screen 64.

Figure 3:
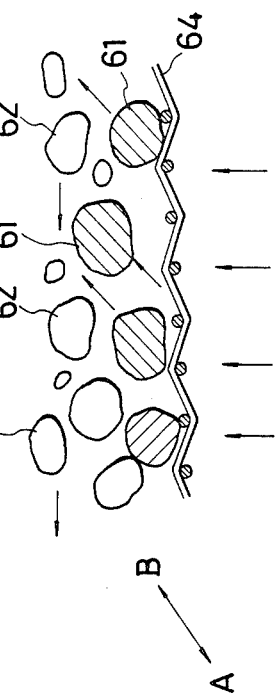

On the other hand, although a metal 61 having a high specific gravity contained in the residual slag 34 is not floated by the upward air current to remain on the screen 64, the metal 61 is pushed in the direction of B shown in FIG. 3 by the vibration of the screen 64 to result in upward transfer, thus separating the metal 61 from the slag 62.

The metal 61 is thus recovered from the residual slag 34, but the slag 62 still contains a metal having a relatively small particle size. Magnet-adherent metals such as Fe or Ni are recovered by a magnetic separator 65 from the slag 62. The magnetic separator 65 has the same construction as the one of the above magnetic separator 47, so that the same numerals as those used in the separator 47 are used in the separator 65 to omit any detailed description.

A magnet-adherent metal 66 is recovered from the slag 62 with this separator 65 and reused as a material for steel as well as the metals 44 and 61 and the magnet-adherent metal 48. The residual tailing 67, can be used as a filler for civil engineering works, plastics or the like as well as the tailing 49 and and the dust 57.

In the above example, the same dry vibrating air classifier at the above-described one may be used instead of the air classifier 43.

Although a stainless steel slag is used as a slag generated in an iron works in the above example, the present invention can be also applied to a common steel slag or a special steel slag.

For reference, the composition of the tailing obtained in the above example is shown in Table 2.

TABLE 2

| | SiO$_2$ | Al$_2$O$_3$ | T.Fe | CaO | MgO | Cr | Ni |
|---|---|---|---|---|---|---|---|
| | | | | | | | (weight %) |
| A | 19.0 | 5.9 | 5.0 | 50.2 | 7.3 | 1.4 | — |
| B | 10.3 | 1.2 | 15.4 | 43.9 | 5.4 | — | — |
| C | 50.3 | 2.7 | 3.4 | 17.0 | 24.8 | 1.9 | 0.03 | wherein A is a tailing of a stainless steel slag, B is the one of a common steel slag and C is the one of a special steel slag.

The particle size distribution of the powdery dust 57 collected by the bag filter 58 in each case using various steel slags is shown in Table 3.

TABLE 3

| μm | +149 | 149~105 | −105 | (weight %) TOTAL |
|---|---|---|---|---|
| D | 1 | 6 | 93 | 100 |
| E | 2 | 8 | 90 | 100 |
| F | 3 | 8 | 89 | 100 | wherein D is the case of using stainless steel slag as raw material, E is the case of using common steel slag and F is the case of using special steel slag.

The particle size distribution of the tailing 49 obtained in each case using various steel slags is shown in Table 4.

TABLE 4

| μm | +149 | 149~105 | −105 | (weight %) TOTAL |
|---|---|---|---|---|
| G | 10 | 19 | 71 | 100 |
| H | 12 | 23 | 65 | 100 |
| I | 13 | 21 | 66 | 100 | wherein G is the case of using stainless steel slag as raw material, H is the case of using common steel slag and I is the case of using special steel slag.

The particle size distribution of the tailing 67 remaining after the treatment with the magnetic separator 65 is shown in Table 5.

TABLE 5

| mm | +15 | 15~10 | 10~7 | 7~5 | 5~3 | −3 | (weight %) TOTAL |
|---|---|---|---|---|---|---|---|
| J | 2 | 11 | 15 | 32 | 30 | 10 | 100 |
| K | 3 | 13 | 21 | 30 | 25 | 8 | 100 |
| L | 4 | 12 | 20 | 28 | 30 | 6 | 100 | wherein J is the case of using stainless steel slag as raw material, K is the case of using common steel slag and L is the case of using special steel slag.

Figure 4:
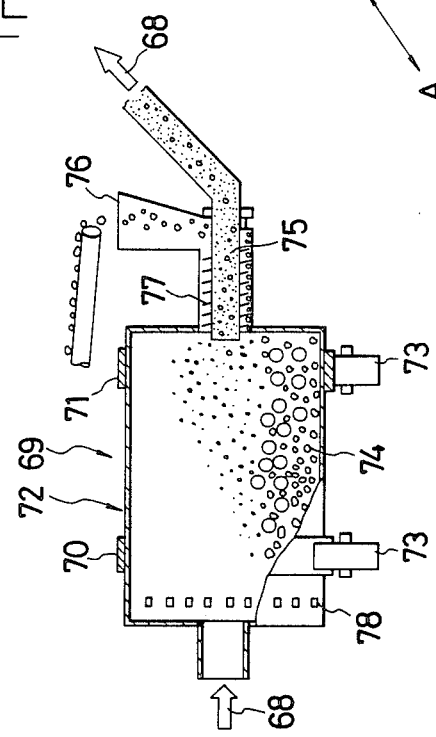
FIG. 4 is a side elevation illustrating a ventilated mill used in another example according to the present invention.

Although a parallel-flow ventilated mill wherein the direction of proceeding of a material is the same as the one of an air current flowing in the drum 25 was used as a ventilated mill 21 in the above example, a countercurrent one 69 wherein the direction of flowing of an air current is opposite to the direction of proceeding of a slag (i.e. material) may be used as shown in FIG. 4 to enable the more effective crushing of the slag 10.

As shown in the figure, this countercurrent ventilated mill 69 comprises a drum 72 fitted with rail rings 70 and 71, four drive tyres 73 supporting the drum 72 rotatably via the rail rings 70 and 71, steel ball 74, which is an example of crushing media, provided in the drum 72, a material outlet 75 provided at the center of one side of the drum 72 and a material inlet 76 provided outside the outlet 75. The slag 10 thrown from the material inlet 76 is transferred into the drum 72 by a screw conveyor 77 and crushed by the impact of the steel ball 74 caused by the rotation of the drum 72.

The slag 10 thus crushed is divided into metals which can not be easily crushed and a light slag. The slag is blown off by the air current to be transferred to the material outlet 75, while the metals are discharged from an outlet 78 having a specified size and formed on the other side of the drum 72.

What is claimed is:

1. A process for the treatment of slag generated in an ironworks, which comprises the step of rough crushing to crush solidified slag generated in an ironworks into pieces with 50 mm or less particle size by use of a dry-type crusher, further crushing for separation to classify said roughly crushed slag into a light slag dust and a residual heavy slag with 20 mm or less particle size by use of a ventilated mill, separation by specific gravity to extract metal components having a high specific gravity from said crushed and separated residual heavy slag by use of a dry-type classifier and magnetic separation to recover magnet-adherent metals from the remaining slag from which said metal components are extracted through said step of separation by specific gravity, wherein an upward-draft type dry air vibrating classifier provided with a gradually sloped screen subjected to an updraft of air from a fan and to vibration in an ascending direction at a frequency of 5–20 Hz is used as a classifier in said step of separation by specific gravity and on said screen metal components and slag are separated so that metal components with a higher specific gravity are moved upward by the vibration of the screen and the remainder, having a lower specific gravity, is moved downward under the influence of the air updraft.

* * * * *